United States Patent
Martter et al.

(10) Patent No.: US 11,884,823 B2
(45) Date of Patent: Jan. 30, 2024

(54) PNEUMATIC TIRE

(71) Applicant: The Goodyear Tire & Rubber Company, Akron, OH (US)

(72) Inventors: Teresa Diane Martter, Akron, OH (US); Nihat Ali Isitman, Hudson, OH (US); Becky Gerette Rickman, Uniontown, OH (US); Anthony Joseph Ramic, North Royalton, OH (US); Karmena Izabela Anyfantaki, Helmsange (LU); Aaron Patrick Murray, Chardon, OH (US); Eric Engeldinger, Redange-sur-Attert (LU); Marc Weydert, Bertrange (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 205 days.

(21) Appl. No.: 16/714,876

(22) Filed: Dec. 16, 2019

(65) Prior Publication Data

US 2021/0179822 A1    Jun. 17, 2021

(51) Int. Cl.
    C08L 9/06      (2006.01)
    B60C 1/00      (2006.01)
    B60C 11/00     (2006.01)

(52) U.S. Cl.
    CPC .............. C08L 9/06 (2013.01); B60C 1/0016 (2013.01); B60C 11/0008 (2013.01); *B60C 2011/0025* (2013.01); *C08L 2205/025* (2013.01); *C08L 2205/03* (2013.01); *C08L 2205/035* (2013.01); *C08L 2207/322* (2013.01)

(58) Field of Classification Search
    CPC .. C08L 9/06; C08L 2205/025; C08L 2205/03; B60C 1/0016; B60C 11/0008
    USPC .......................................................... 524/68
    See application file for complete search history.

(56) References Cited

U.S. PATENT DOCUMENTS

| | | | |
|---|---|---|---|
| 7,671,128 B1 * | 3/2010 | Thielen | B60C 1/00 524/526 |
| 8,450,424 B2 | 5/2013 | Koelle et al. | |
| 9,556,331 B2 | 1/2017 | Tahon et al. | |
| 9,856,368 B2 | 1/2018 | Herzog et al. | |
| 10,207,540 B2 | 2/2019 | Cato et al. | |
| 2004/0092644 A1 * | 5/2004 | Labauze | C08L 9/00 524/495 |
| 2004/0261927 A1 | 12/2004 | Weydert et al. | |
| 2012/0289647 A1 * | 11/2012 | Koelle | B29B 7/7495 524/525 |
| 2013/0131263 A1 * | 5/2013 | Nebhani | B60C 1/00 524/575 |
| 2014/0329930 A1 | 11/2014 | Sato | |
| 2015/0343843 A1 | 12/2015 | Cato et al. | |
| 2016/0159147 A1 | 6/2016 | Isitman et al. | |
| 2016/0280007 A1 * | 9/2016 | Cato | C08L 15/00 |
| 2016/0376427 A1 * | 12/2016 | Sandstrom | B60C 1/0016 524/313 |
| 2016/0376428 A1 | 12/2016 | Sandstrom et al. | |
| 2017/0158845 A1 | 6/2017 | Nakajima | |
| 2017/0174876 A1 | 6/2017 | Maeijma | |
| 2018/0284085 A1 | 10/2018 | Arigo et al. | |
| 2021/0079200 A1 | 3/2021 | Labrunie | |

FOREIGN PATENT DOCUMENTS

| | | | |
|---|---|---|---|
| EP | 2182028 B1 | | 12/2012 |
| EP | 3 059 256 | * | 2/2015 |
| EP | 2607103 B1 | | 4/2016 |
| EP | 2748014 B1 | | 7/2016 |
| KR | 20030008550 A | | 1/2003 |
| KR | 20180038146 A | | 4/2018 |
| WO | 2018079801 A1 | | 5/2018 |

OTHER PUBLICATIONS

European Search Report for Serial No. EP20213238 dated Apr. 29, 2021.
Translation of Chinese Search Report for Serial No. 202011487394 dated Sep. 19, 2022.

* cited by examiner

*Primary Examiner* — Doris L Lee
(74) *Attorney, Agent, or Firm* — Mandy B. Willis

(57) ABSTRACT

The invention is directed to a pneumatic tire comprising a vulcanization rubber composition, the vulcanizable rubber composition comprising: from 30 to 90 phr of a first functionalized styrene-butadiene rubber having a glass transition temperature Tg1 ranging from −70 to −50° C.; from 10 to 50 phr of a second functionalized styrene-butadiene rubber having a glass transition temperature Tg2 ranging from −110 to −70° C.; wherein Tg2−Tg1 is at least 10° C.; from 0 to 40 phr of at least one additional elastomer; from 50 to 150 phr of silica; from 0 to 50 phr of a hydrocarbon resin; and from 10 to 50 phr of an oil.

5 Claims, No Drawings

PNEUMATIC TIRE

BACKGROUND

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads.

Tires are sometimes desired with treads for promoting traction on snowy surfaces. Various rubber compositions may be proposed for tire treads. Here, the challenge is to reduce the cured stiffness of such tread rubber compositions, as indicated by having a lower storage modulus G' at $-20°$ C., when the tread is intended to be used for low temperature winter conditions, particularly for vehicular snow driving.

It is considered that significant challenges are presented for providing such tire tread rubber compositions for maintaining both their wet traction while promoting low temperature (e.g., winter) performance.

SUMMARY

The present invention is directed to a pneumatic tire comprising a vulcanization rubber composition, the vulcanizable rubber composition comprising: from 30 to 90 phr of a first functionalized styrene-butadiene rubber having a glass transition temperature Tg1 ranging from $-70$ to $-50°$ C.; from 10 to 50 phr of a second functionalized styrene-butadiene rubber having a glass transition temperature Tg2 ranging from $-110$ to $-70°$ C.; wherein Tg2$-$Tg1 is at least $10°$ C.; from 0 to 40 phr of at least one additional elastomer; from 50 to 150 phr of silica; from 0 to 50 phr of a hydrocarbon resin; and from 10 to 50 phr of an oil.

DESCRIPTION

There is disclosed a pneumatic tire comprising a vulcanization rubber composition, the vulcanizable rubber composition comprising: from 30 to 90 phr of a first functionalized styrene-butadiene rubber having a glass transition temperature Tg1 ranging from $-70$ to $-50°$ C.; from 10 to 50 phr of a second functionalized styrene-butadiene rubber having a glass transition temperature Tg2 ranging from $-110$ to $-70°$ C.; wherein Tg2$-$Tg1 is at least $10°$ C.; from 0 to 40 phr of at least one additional elastomer; from 50 to 150 phr of silica; from 0 to 50 phr of a hydrocarbon resin; and from 10 to 50 phr of an oil.

The vulcanizable rubber composition includes from 30 to 90 phr of a first functionalized styrene-butadiene rubber having a glass transition temperature Tg1 ranging from $-70$ to $-50°$ C., and from 10 to 50 phr of a second functionalized styrene-butadiene rubber having a glass transition temperature Tg2 ranging from $-110$ to $-70°$ C. In one embodiment, Tg2$-$Tg1 is at least $10°$ C.; alternatively, Tg2$-$Tg1 is at least $15°$ C., alternatively, Tg2$-$Tg1 is at least $20°$ C.

Suitable styrene-butadiene rubber as the first and second functionalized styrene-butadiene rubbers may be functionalized with various functional groups. In one embodiment, the styrene-butadiene rubber may be functionalized with an alkoxysilane group and a functional group selected from sulfur containing functional groups and amino functional groups. Suitable sulfur containing groups include thiol, thioether, thioester, sulfide, or sulfanyl group. Suitable amino functional groups include primary, secondary, and tertiary amino groups. Additional examples of rubbers which may be used include solution polymerized styrene-butadiene functionalized with groups such as alkoxy including monoalkoxy, dialkoxy, and trialkoxy, silyl, thiols, thioester, thioether, sulfanyl, mercapto, sulfide, and combinations thereof. Such functionalized solution polymerized polymers may be functionalized at the polymer chain ends for example via functional initiators or terminators, or within the polymer chains for example via functional monomers, or a combination of in-chain and end-of-chain functionalization. Specific examples of suitable functional solution polymerized polymers include those described in U.S. Pat. Nos. 8,217,103 and 8,569,409 having alkoxysilyl and sulfide (i.e. thioether) functionality. Such thiol functionality includes thiol or sulfanyl functionality arising from cleavage of sulfur containing groups during compound processing, such as for example from thioesters and thioethers. In on embodiment the styrene-butadiene rubber is functionalized with an alkoxysilane group and at least one of a primary amine group and thiol group. In one embodiment, the styrene-butadiene rubber is obtained by copolymerizing styrene and butadiene, and characterized in that the styrene-butadiene rubber has a primary amino group and/or thiol group and an alkoxysilyl group which are bonded to the polymer chain. In one embodiment, the alkoxysilyl group is an ethoxysilyl group.

The functional group(s) may be bonded to any of a polymerization initiating terminal, a polymerization terminating terminal, a main chain of the styrene-butadiene rubber and a side chain, as long as it is bonded to the styrene-butadiene rubber chain. However, the functional group(s) is preferably introduced to the polymerization initiating terminal or the polymerization terminating terminal, in that the disappearance of energy at a polymer terminal is inhibited to improve hysteresis loss characteristics. Thus, in one embodiment, the first and second functionalized styrene-butadiene rubbers are end-functionalized and are not in-chain functionalized.

The styrene-butadiene rubber can be produced by polymerizing styrene and butadiene in a hydrocarbon solvent by anionic polymerization using an organic alkali metal and/or an organic alkali earth metal as an initiator, adding a terminating agent compound having a functional group protected with a protective group to react it with a living polymer chain terminal at the time when the polymerization has substantially completed, and then conducting deblocking, for example, by hydrolysis or other appropriate procedure. In one embodiment, the styrene-butadiene rubber can be produced as disclosed in U.S. Pat. No. 7,342,070. In another embodiment, the styrene-butadiene rubber can be produced as disclosed in WO 2007/047943.

In one embodiment, the terminating agent compound having a protected primary amino group and an alkoxysilyl group may be any of various compounds as are known in the art. In one embodiment, the compound having a protected primary amino group and an alkoxysilyl group may include, for example, N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl) aminopropyltriethoxysilane, N,N-bis(trimethylsilyl) aminopropylmethyldiethoxysilane, N,N-bis(trimethylsilyl) aminoethyltrimethoxysilane, N,N-bis(trimethylsilyl)- aminoethyltriethoxysilne, N,N-bis(trimethylsilyl) aminoethylmethyldimethoxysilane, N,N-bis(trimethylsilyl) aminoethylmethyldiethoxysilane, etc., and preferred are 1-trimethylsilyl-2,2-dimethoxy-1-aza-2-silacyclopentane, N,N-bis(trimethylsilyl) aminopropylmethyldimethoxysilane and N,N-bis(trimethylsilyl)aminopropylmethyldiethoxysilane. In one embodiment, the compound having a protected primary amino group and an alkoxysilyl group is N,N-bis (trimethylsilyl)aminopropyltriethoxysilane.

The first and second solution polymerized styrene-butadiene rubbers respectively have a glass transition temperature Tg1 in a range from −70° C. to −50° C. and Tg2 in a range from −110° C. to −70° C. In one embodiment, Tg2−Tg1 is at least 10° C.; alternatively, Tg2−Tg1 is at least 15° C., alternatively, Tg2−Tg1 is at least 20° C. A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

The rubber composition may include from 0 to 40 phr of one or more additional rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

In one embodiment, the additional elastomer is from 10 to 30 phr of a styrene-butadiene rubber with a Tg ranging from −20 to −40° C. In one embodiment, the additional elastomer is an end-functionalized styrene-butadiene rubber with a Tg ranging from −20 to −40° C.

The term "phr" as used herein, and according to conventional practice, refers to "parts by weight of a respective material per 100 parts by weight of rubber, or elastomer."

The rubber composition also includes from 10 to 50 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition includes from 0 to 50 phr of a hydrocarbon resin having a Tg greater than 30° C.

Representative hydrocarbon resins include coumarone-indene-resins, petroleum resins, C5, C9, C5/C9 resins, DCPD and modified DCPD resins, terpene resins, alphamethyl styrene resins and mixtures and/or modification and/or hydrogenation thereof.

The rubber composition may include from about 50 to about 150 phr of silica. In another embodiment, from 80 to 130 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Solvan, with, for example, designations of Z1165MP and Z165GR and silicas available from Evonik with, for example, designations VN2 and VN3, etc.

Commonly employed carbon blacks can be used as a conventional filler in an amount up to 10 phr. In another embodiment, up to 5 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

In one embodiment, the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Evonik.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

Alternatively, the rubber composition may be used in various manufactured items including but not limited to tire treads, shoes, shoe soles, transmission belts, hoses, airsprings, conveyor belts, track belts, and vibration isolators.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Examples

In this example, the effect of combining functionalized styrene-butadiene rubber of varying Tg is illustrated. Rubber compounds were mixed in a multi-step mix procedures following the compositions given in Table 1, with all amounts in phr. Cured samples were tested for physical properties with results give in Table 2. Samples C1 to C4 were made for comparative purposes to contain 1) a combination of a high and a low Tg functionalized SBR and 2) 100 phr of a low Tg functionalized SBR. The inventive examples, on the other hand, contain a combination of two low Tg functionalized SBRs.

It is observed that a combination of two functionalized polymers, both of which having Tg below −50° C., provides similar or better predictive properties for Wet, RR and Snow in comparison to 1) a combination of a high and a low Tg functionalized SBR and 2) 100 phr of a low Tg functionalized SBR.

TABLE 1

|  | C-1 | C-2 | C-3 | C-4 | I-1 | I-2 |
|---|---|---|---|---|---|---|
| SBR1 (functionalized, Tg −23° C.)1 | 30 | 0 | 0 | 40 | 0 | 0 |
| SBR2 (functionalized, Tg −73° C.)2 | 70 | 0 | 0 | 0 | 30 | 0 |
| SBR3 (functionalized, Tg −60° C.)3 | 0 | 100 | 0 | 0 | 0 | 0 |
| SBR4 (functionalized, Tg −60° C.)4 | 0 | 0 | 100 | 0 | 0 | 0 |
| SBR5 (functionalized, Tg −80° C.)5 | 0 | 0 | 0 | 60 | 0 | 20 |
| SBR6 (functionalized, Tg −55° C.)6 | 0 | 0 | 0 | 0 | 70 | 80 |
| Hydrocarbon Traction Resin | 10 | 10 | 10 | 10 | 10 | 10 |
| Petroleum oil | 28 | 28 | 28 | 28 | 28 | 28 |
| Precipitated silica | 90 | 90 | 90 | 90 | 90 | 90 |
| Silane coupling agent | 9 | 9 | 9 | 9 | 9 | 9 |
| Antidegradants | 4.8 | 4.8 | 4.8 | 4.8 | 4.8 | 4.8 |
| Stearic acid | 5 | 5 | 5 | 5 | 5 | 5 |
| Sulfur | 1.3 | 1.3 | 1.3 | 1.3 | 1.3 | 1.3 |
| Zinc oxide | 1.8 | 1.8 | 1.8 | 1.8 | 1.8 | 1.8 |
| Cure accelerators | 4.8 | 4.8 | 4.8 | 4.8 | 4.8 | 4.8 |

1Solution polymerized styrene-butadiene rubber, Tg = −23° C., end functionalized with sulfide and alkoxysilane groups as SE SLR 4602 from Trinseo
2Solution polymerized styrene-butadiene rubber, Tg = −73° C., functionalized, as F1810 from LG Chem.
3Solution polymerized styrene-butadiene rubber, Tg = −60° C., end functionalized with sulfide and alkoxysilane groups as SE SLR 3402 from Trinseo
4Solution polymerized styrene-butadiene rubber, Tg = −60° C., end functionalized with aminoalkoxysilane groups, from Goodyear.
5Solution polymerized styrene-butadiene rubber, Tg = −80° C., end functionalized with aminoalkoxysilane groups, from Goodyear.
6Solution polymerized styrene-butadiene rubber, Tg = −55° C., end functionalized with aminoalkoxysilane groups, from Goodyear.

TABLE 2

|  | C-1 | C-2 | C-3 | C-4 | I-1 | I-2 |
|---|---|---|---|---|---|---|
| SBR1 (functionalized, Tg −23° C.) | 30 | 0 | 0 | 40 | 0 | 0 |
| SBR2 (functionalized, Tg −73° C.) | 70 | 0 | 0 | 0 | 30 | 0 |
| SBR3 (functionalized, Tg −60° C.) | 0 | 100 | 0 | 0 | 0 | 0 |
| SBR4 (functionalized, Tg −60° C.) | 0 | 0 | 100 | 0 | 0 | 0 |
| SBR5 (functionalized, Tg −80° C.) | 0 | 0 | 0 | 60 | 0 | 20 |
| SBR6 (functionalized, Tg −55° C.) | 0 | 0 | 0 | 0 | 70 | 80 |
| Wet predictive properties |  |  |  |  |  |  |
| Rebound at 0° C. (lower is better)[1] | 22 | 26 | 26 | 21 | 24 | 24 |
| TanDelta at 0° C. (higher is better)[2] | 0.31 | 0.28 | 0.27 | 0.32 | 0.28 | 0.27 |
| RR predictive properties |  |  |  |  |  |  |
| Rebound at 100° C. (higher is better)[1] | 64 | 64 | 66 | 65 | 67 | 68 |

TABLE 2-continued

|  | C-1 | C-2 | C-3 | C-4 | I-1 | I-2 |
| --- | --- | --- | --- | --- | --- | --- |
| TanDelta at 30° C. (lower is better)[2] | 0.18 | 0.20 | 0.18 | 0.19 | 0.16 | 0.16 |
| Winter predictive property[2] | | | | | | |
| G' at −20° C. (MPa) (lower is better) | 6.2 | 8.4 | 7.0 | 8.7 | 6.3 | 6.6 |
| Tensile properties[3] | | | | | | |
| Stress at break (MPa) | 18.4 | 17.6 | 20.7 | 16.8 | 21.2 | 20.2 |
| Strain at break (%) | 485 | 470 | 510 | 442 | 506 | 506 |

[1] Rebound is a measure of hysteresis of the compound when subject to loading, as measured by ASTM D1054. Generally, the lower the measured rebound at 0° C., the better the wet grip property. Generally, the higher the measured rebound at 100° C., the lower the rolling resistance.
[2] The tanD and G' modulus at various temperatures can be readily be determined by means of an ARES dynamic mechanical analyzer. The test specimen is subjected to around 3% sinusoidal deformation at 10 Hz and the temperature is varied. The test method is understood to be similar to ISO 6721.
[3] Data according to Automated Testing System instrument by the Instron Corporation. Data reported in the table is generated by running the dumbbell-shaped specimens to tensile failure at room temperature.

What is claimed is:

1. A pneumatic tire comprising a vulcanizable rubber composition, the vulcanizable rubber composition comprising:

from 70 to 90 phr of a first low Tg functionalized solution polymerized styrene-butadiene rubber having a glass transition temperature Tg1 ranging from −70 to −55° C.;

from 10 to 30 phr of a second low Tg functionalized solution polymerized styrene-butadiene rubber having a glass transition temperature Tg2 ranging from −100 to −70° C.;

wherein Tg2−Tg1 is at least 10° C. but less than 30° C.;

wherein the rubber composition is further devoid of a homopolymer of butadiene;

10 to 30 phr of an additional styrene-butadiene rubber with a Tg ranging from −20 to −40° C.;

from 50 to 150 phr of silica;

from 0 to 50 phr of a hydrocarbon resin; and from 10 to 50 phr of an oil.

2. The pneumatic tire of claim 1, wherein the first and second functionalized styrene butadiene rubbers are end-functionalized.

3. The pneumatic tire of claim 1, wherein Tg2−Tg1 is at least 15° C.

4. The pneumatic tire of claim 1, wherein Tg2−Tg1 is at least 20° C.

5. The pneumatic tire of claim 1, wherein the additional styrene-butadiene rubber end-functionalized.

* * * * *